United States Patent Office 2,712,562
Patented July 5, 1955

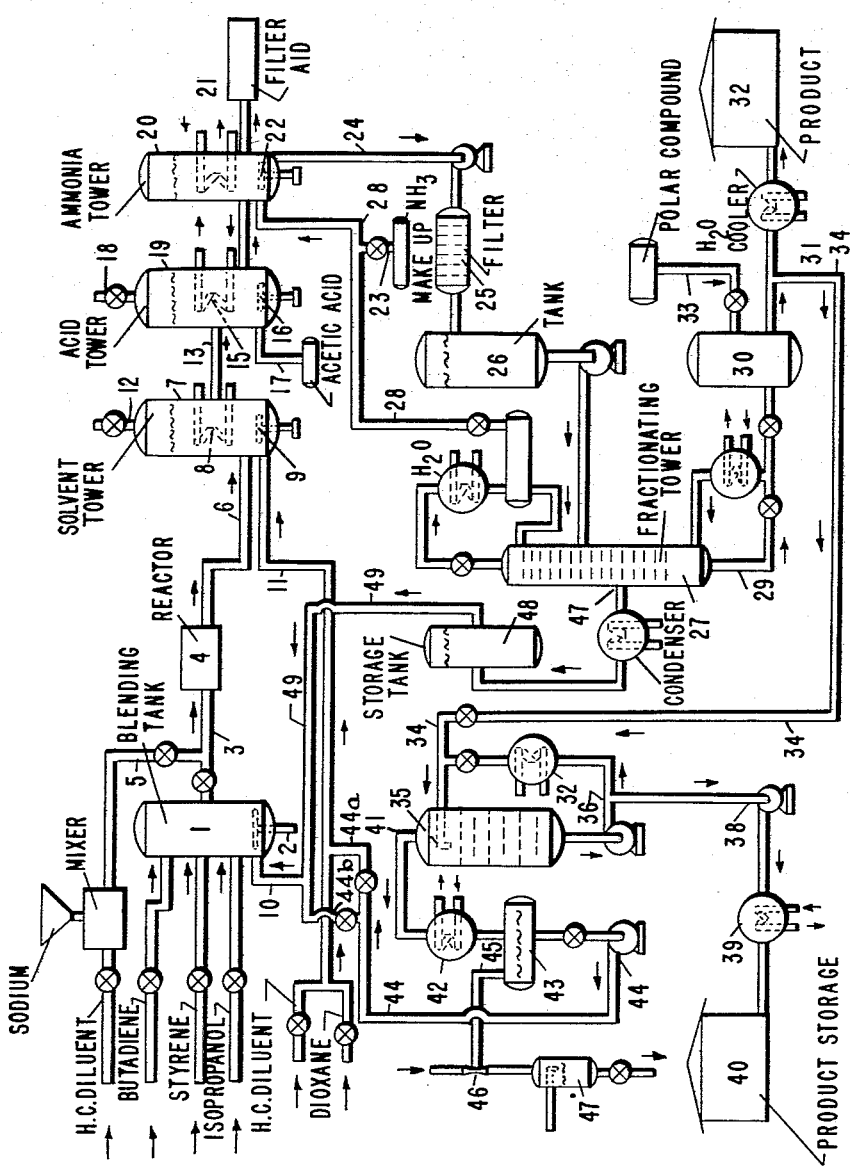

2,712,562

HYDROCARBON DRYING OIL PRODUCTION

Robert F. Leary, Cranford, Stanley E. Jaros, Rahway, and Anthony H. Gleason, Westfield, N. J., assignors to Esso Research and Engineering Company, a corporation of Delaware Application March 5, 1954, Serial No. 414,328

4 Claims. (Cl. 260—669)

This invention relates to a process for making a drying oil or varnish by polymerization of a diolefin such as butadiene in the presence of sodium and is a continuation-in-part of application Serial No. 134,714, filed December 23, 1949.

Drying oils of excellent quality can be made by polymerizing 100 parts of butadiene monomer, or particularly by copolymerizing about 75 to 85 parts of butadiene-1,3 and about 25 to 15 parts of styrene at 25 to 100° C., preferably at 65 to 85° C., in the presence of about 50 to 500 parts of an inert hydrocarbon diluent boiling between about 0 and 250° C., or preferably between 50 and 200° C., such as pentane, benzene, cyclohexane, naphtha or mineral spirits. Where low boiling materials are used, it is desirable to operate under sufficient pressure to maintain the charge in liquid phase, e. g. under pressures ranging from 1 to 5 atmospheres. About 0.1 to 10 parts, preferably about 1 to 3 parts of finely divided sodium metal is used as catalyst. Certain promoting agents, e. g. about 10 to 50 parts of dioxane and catalyst activators, e. g. 1 to 20 per cent of isopropyl alcohol based on the weight of sodium, are also preferably added to the reaction mixture to assure the production of a colorless oil and to shorten the reaction time. Throughout this specification, all references to proportions of materials are expressed in parts by weight, unless stated otherwise.

When the reaction has reached the desired conversion, which may be about 50, 80 or preferably 100%, the catalyst is destroyed and converted into an easily filtrable salt by addition of an essentially anhydrous monobasic saturated $C_1$ to $C_5$ organic acid which is soluble in the hydrocarbon mixture. The acid, such as formic, acetic or pentanoic, is added directly to the crude reaction product and the resulting sodium salt is thereafter separated from the crude product by filtration. Then the crude filtrate is fractionated to remove the promoting and activating agents as well as any unreacted monomer and promoter and also to adjust the concentration of the oily polymer in the product to the desired level, which may be between about 30 and 99% non-volatile matter.

Unlike natural drying oils the resulting product is useful as a varnish without requiring any further treatment for purposes of bodying or the like, but nevertheless it is often desirable to subject the product to a heating step for about 30 to 240 minutes at about 120 to 180° C. whereby certain properties such as gloss of the films derived from the oil are improved. It is particularly advantageous to carry out the heating step in the presence of a small amount of a polar compound such as maleic anhydride, acrylonitrile or thioglycolic acid.

The catalyst used is in the form of finely divided particles having an average particle size of less than 200 microns, e. g. between 1 and 100 microns, preferably between 10 and 50 microns. When catalyst of such finely divided size is used, then the amount of catalyst will not exceed 2.0% by weight. This is unexpected since it is generally considered that the production of liquid polymers requires the use of large amounts of catalyst. The catalyst may be any one of the alkali metals, such as sodium, potassium or the like.

When adapting the process to continuous operation it is desirable to maintain an essentially constant quantity of material in the reactor into which the feed streams are introduced. The addition and withdrawal of materials is at such a rate as to permit the formation and maintenance of polymer in a concentration of at least about 8⅓% by weight in the reaction mixture at a conversion of 50% when the maximum amount of solvent is used. At 100% conversion the reactor concentration will vary between 15 and 66⅔ weight percent depending on the amount of solvent present.

It is the principal object of the present invention to devise an improved process for the sodium polymerization of butadienoid drying oils on an industrial scale. This and other objects will appear more clearly from the subsequent description wherein the accompanying drawing schematically illustrates the preferred equipment and flow sheet involved in carrying out the invention.

Referring to Figure 1, the reaction mixture is preferably made up in blending tank 1 into which butadiene, styrene, isopropyl alcohol, the ether promoter and straight run mineral spirits or other hydrocarbon diluent are introduced in the desired proportions. The reaction monomers and make-up quantities of the alcohol are introduced to tank 1 from conventional storage facilities not shown and further amounts of the alcohol, ether and the hydrocarbon diluent are introduced to tank 1 through recycle line 10 which leads from the recovery equipment described later. After the materials have been properly mixed in tank 1 by means of stirrer 2, a stream of the resulting mixture is withdrawn through line 3 to reactor 4.

This reactor may be simply a one-stage equilibrium reactor from which the polymerized product is continuously withdrawn therefrom after a certain residence time or it may be a coil connected to a reactor provided with a stirrer, or a single coil having the necessary length to give the desired reaction. Thus the reaction may be carried out in a single vessel or in a plurality of vessels with partial conversion in all but the last vessel. Prior to entering reactor 4 line 3 may be joined by line 5 through which sodium catalyst is introduced into reactor 4 preferably in the form of a slurry of finely divided catalyst particles in mineral spirits or other suitable hydrocarbon liquid. Alternatively, catalyst line 5 may enter the reactor separately. Instead of mixing the styrene monomer into the feed in tank 1, it may be introduced directly into reactor 4 by a separate line as will be described later.

For the batch process p-dioxane has been found to be the outstanding promoter while ethyl ether is superior for the continuous process. In general straight chain mono or diethers of 2 to 8 carbon atoms, and the cyclic diethers having the oxygen atoms separated by at least two carbon atoms are suitable. Examples of such ethers include diethyl ether, diethyl acetal, diethyl ether of ethylene glycol, dioxane, etc.

After a reaction or residence time sufficient to allow for the desired conversion of monomers, which time may range between about 10 minutes and 10 hours depending principally on size and design of reactor, reaction temperature, catalyst concentration and particle size, the crude reaction product is withdrawn from reactor 4 through line 6 which leads to diluent treating drum 7 which contains stirrer 9 and a suitable cooling device such as internal coil 8 capable of removing any undue heat of reaction that may be generated in this zone. In this drum the partially spent sodium catalyst contained in the reaction mixture is utilized as a treating agent to remove or destroy all water and other inhibiting impurities that are or may be present in the make-up hydrocarbon and the other materials which are introduced into drum 7 through line 11. Although the introduction of the diluent and other materials at this point somewhat increases the load on the fractionation equipment used in the recovery step described later, this or an equivalent pretreatment of the diluent with sodium is one of the essential elements of the present process in that it is surprisingly effective in improving the overall efficiency of the system, as opposed to a process wherein untreated make-up materials are fed directly to the reactor. This is particularly true as regards pre-treating the hydrocarbon diluent, which constitutes the predominant fraction of the make-up streams in view of the fact that a substantial proportion of the diluent is eventually withdrawn in the final product. Conversely, in view of the relatively minute amount of dioxane required in the make-up stream solely to compensate for losses, it is feasible to introduce the latter into the reaction without pre-treatment. The addition of the hydrocarbon diluent into drum 7 has the further advantage of facilitating subsequent flow and filtration of the crude polymerization product which is quite viscous when cold, unless suitably diluted.

Water contained in the make-up diluent reacts with the sodium catalyst in drum 7 and liberated hydrogen is withdrawn overhead through line 12. The crude product, diluted with an amount of make-up hydrocarbon solvent approximately compensating for the amount of solvent contained in the finished product, is withdrawn from drum 7 through line 13 to another drum 14 provided with cooling device 15 and agitator 16. A slight excess of anhydrous acetic acid is continuously introduced into drum 14 through line 17 in order to react with the remaining sodium catalyst and thereby convert it into sodium acetate which is an inert, easily filtrable salt. Hydrogen gas produced in this reaction is removed from acid treating drum 14 through line 18. From drum 14 the acidified crude product is continuously transferred through line 19 to drum 20 also preferably provided with a cooling device 21 and agitator 22. In drum 20 the small amount of excess free acid is neutralized with ammonia gas which is bubbled in through line 28. A suitable filter aid such as kieselguhr or fuller's earth is also introduced into ammonia treating drum 20 so as to facilitate subsequent filtration of the salts from the product. It is particularly convenient to add the filter aid in the form of a thick slurry, e. g. as a dispersion in the same kind of hydrocarbon used as reaction diluent.

From drum 20 the crude product is withdrawn through line 24 and passed through conventional filtration equipment such as a filter press or even a continuous rotary vacuum filter 25. Efficient use of the latter is possible due to the crystalline form of the filtrate obtained when operating in accordance with the novel process. The filtered product is then run off to storage drum 26 which serves to smooth out any undue variations in flow rate. From drum 26 the filtered product is fed continuously to distillation tower 27 which removes excess ammonia as an overhead stream 28, concentrates a bottom stream 29 containing the oily polymer of the preferred concentration of about 50 to 70% polymer in hydrocarbon diluent, and allows the withdrawal of a vapor side stream 47 which contains dioxane, any residual isopropyl alcohol as well as excess hydrocarbon diluent. The vapor stream 47 is condensed, passed to storage tank 48 and eventually recycled to blending tank 1 through line 49.

The ammonia stream 28 is recycled to treating tank 20 after being supplemented with fresh ammonia stream 23. Product stream 29 is preferably passed through heat treating drum 30 where the drying oil is kept for about 30 to 120 minutes at a temperature of about 120 to 250° C., preferably about 150° C., in order to improve the gloss films derived from the oil and finally the product is passed through cooler 31 to storage tank 32. If desired, a small amount, such as 0.01 to 1% based on polymer of a polar compound such as maleic anhydride is also fed continuously to tank 30 through line 33 in order to further improve the film-forming properties of the product.

The storage tank is preferably provided with a steam coil or other suitable heating device adapted to maintain the tank contents at a temperature of about 40° C. or higher in order to maintain the viscous product in a state sufficiently fluid for withdrawal.

Furthermore, all or a part of the product may be tapped off through line 34 to be concentrated further to a concentration between 80 and 99%, preferably between 95 and 98%. This can be done by any convenient means, as for example, by stripping the hydrocarbon solvent from the more dilute product by circulation through baffle drum 35, return line 36 and heater 37, at a temperature of about 150° C. to 200° C. under reduced pressure of about 0.5 to 2 lbs./sq. inch absolute. The concentrated product is finally withdrawn from the bottom of the tower through line 38 and cooler 39 to storage tank 40, preferably maintained at about 90° C. to maintain the viscosity of the product in a range permitting easy pumping. The hydrocarbon solvent stripped overhead is passed through line 41 and water cooler 42 to separating drum 43 wherefrom the condensed, dry hydrocarbon solvent is recycled either through lines 44, 44a and 11 to solvent treating drum 7, or through lines 44, 44b and 10 directly to blending tank 1. The vacuum necessary for the stripping operation can be obtained readily by means of the illustrated arrangement consisting of aspirator line 45 connected to a suitable steam jet ejector 46 which in turn is connected to condenser 47'.

Alternatively, instead of concentrating the oily polymer in drum 35 as described above, the drum may be replaced by a multiplate stripping tower operated under proper conditions, e. g. at a temperature of about 150° C. and a pressure of 0.5 to 2 lb./sq. inch absolute; the use of a suitable stripping gas such as methane improves the efficiency of the tower.

The hydrocarbon diluent, alcohol and dioxane-containing vapor side stream 47 withdrawn from principal fractionation tower 27 is recycled through storage tank 48 and return lines 49 and 10 to blending tank 1.

The following example is offered to illustrate the invention, and it will be understood that all of the specific conditions and limitations given are not necessarily co-extensive with the broad scope of the invention as defined in the claims.

*Example 1*

Two liters of a feed mixture having the composition:

| | G. |
|---|---|
| Butadiene | 2800 |
| Styrene | 700 |
| Varsol | 3500 |
| Naphtha | 3500 |
| Dioxane | 1400 |
| Isopropyl alcohol | 14 | was mixed with 180 cc. of a fine dispersion of 52.5 g. of sodium in 1000 g. of Varsol. The sodium dispersion was prepared by melting the sodium under Varsol at 110–125° C. and stirring with an Eppenbach Homomixer for about 30 seconds. After one hour batch reaction time in a two liter turbomixer, fresh feed and sodium dispersion were added continuously at 30 cc./min. and 2.6 cc./min. respectively. The turbomixer was maintained at 70° C., and the product overflowed into a coil at 97–98° C. The amount of sodium used was about 1.4 percent on monomers. Hourly samples were obtained by quenching the product with a slight excess of acetic acid, filtering, and stripping under vacuum to 10–30 percent non-volatile material. The N. V. M. was determined on each sample and the following yields calculated:

| Sample No. 1 | Polymer, wt. | Conversion, wt. percent |
|---|---|---|
| | G. | |
| 1 | 262 | 69 |
| 2 | 120 | 25 |
| 3 | 87 | 15 |
| 4 | 105 | 21 |
| 5 | 166 | 33 |
| 6 | 209 | 41 |

Samples 1 and 6 were restripped at 5 mm. and adjusted to 50% N. V. M. in Varsol, and the drying rate and chemical resistances of films made therefrom were determined. The following results were obtained:

| Cut | Drying rate, hours (air dried) | | | | |
|---|---|---|---|---|---|
| | 1 | 2 | 4 | 6 | 24 |
| 1 | 8 | 7-8 | 6 | 5 | 0 |
| 6 | 8 | 7-8 | 7 | 7 | 1 |

Rating: 9—wet; 8—very sticky; 7—film just clings to finger; 6—set to touch; 3—decided tack, but dust free; 0—dry, tack free.

| | Chemical Resistance (air dried) | | | | |
|---|---|---|---|---|---|
| | W | G | S | C | F |
| 1 Wk.: | | | | | |
| 1 | 3 | 0 | 2 | 0 | 4 |
| 6 | 4 | 0 | 4 | 3 | 5 |
| 2 Wks.: | | | | | |
| 1 | 4 | 0 | 0 | 0 | 2 |
| 6 | 2 | 0 | 0 | 0 | 5 |

Code: W—water resistance; G—grease resistance; S—soap resistance; C—caustic resistance; F—Flex.
Scale: 0—Unaffected; 9—failure.

The nature of the present invention having been thus fully set forth and specific examples of the same given, what is claimed as new and useful and desired to be secured by Letters Patent is:

1. A continuous method for the production of liquid polybutadiene which comprises continuously maintaining an approximately constant volume of reaction mixture comprising a highly agitated stable dispersion of finely divided alkali metal catalyst having an average particle size of less than 200 microns in a body of liquid hydrocarbon solvent containing butadiene and polybutadiene in a closed reaction vessel at a temperature ranging from 50 to 100° C., introducing butadiene, hydrocarbon solvent, and catalyst into said body of liquid reaction mixture and withdrawing equivalent quantities of reaction mixture therefrom to maintain an approximately constant volume at a rate permitting the formation and maintenance of polybutadiene in a concentration of at least 8⅓ weight percent but not in excess of 66⅔ weight percent in said reaction mixture exclusive of butadiene, the quantity of catalyst employed being not in excess of 2.0 parts by weight per 100 parts total butadiene feed employed, deactivating alkali metal in said solution, and recovering a clear low-color liquid polybutadiene-polymer in dissolved form.

2. Process according to claim 1 in which styrene is admixed with the butadiene feed the quantity of catalyst employed being not in excess of 2.0 parts by weight per 100 parts total monomer feed employed, and a liquid butadiene-styrene copolymer is produced.

3. A continuous method for the production of liquid polybutadiene which comprises continuously maintaining an approximately constant volume of reaction mixture comprising a highly agitated stable dispersion of finely divided sodium metal catalyst having an average particle size of less than 200 microns in a body of liquid hydrocarbon solvent containing 1,3-butadiene and polybutadiene in a closed reaction vessel at a temperature ranging from 50–100° C., introducing 1,3-butadiene feed, hydrocarbon solvent, and catalyst into said body of liquid reaction mixture and withdrawing equivalent quantities of reaction mixture therefrom to maintain an approximately constant volume at a rate permitting the formation and maintenance of polybutadiene in a concentration of at least 8⅓ weight percent, but not in excess of 66⅔ weight percent in said reaction mixture exclusive of butadiene, the quantity of catalyst employed being not in excess of 2.0 parts by weight per 100 parts total butadiene feed employed, deactivating sodium metal, and recovering a clear low-color liquid polybutadiene polymer in dissolved form.

4. Process according to claim 3 in which styrene is admixed with the butadiene feed and a liquid butadiene-styrene copolymer is produced.

References Cited in the file of this patent
UNITED STATES PATENTS
2,631,175   Crouch _____ Mar. 10, 1953